Figure 1:
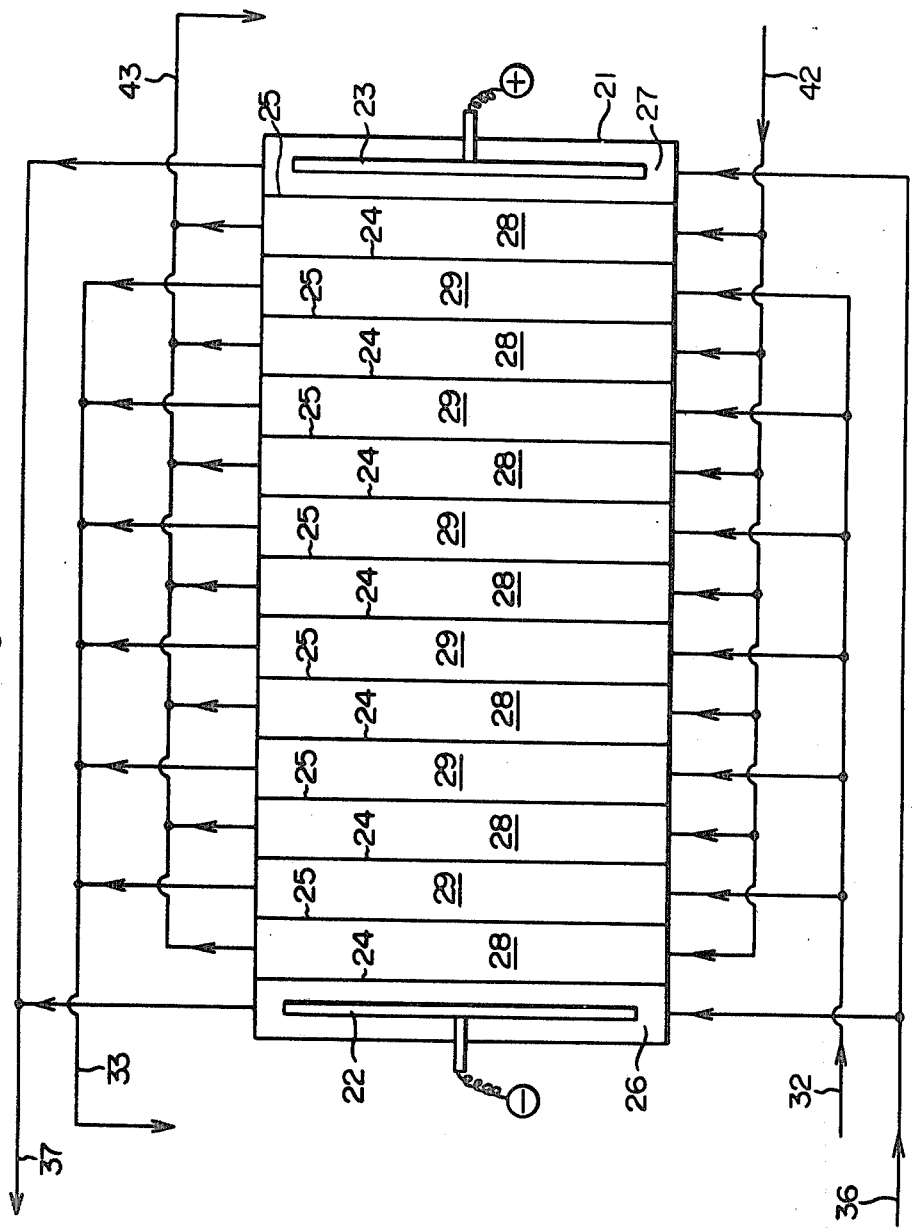

United States Patent [19]

Ono et al.

[11] 4,204,930

[45] May 27, 1980

[54] METHOD AND APPARATUS FOR REGENERATING SPENT PHOTOGRAPHIC BLEACH-FIXER SOLUTION

[75] Inventors: Takezo Ono, Kodaira; Seiki Iribe; Mineo Watanabe, both of Mihara, all of Japan

[73] Assignee: Teijin Limited, Osaka, Japan

[21] Appl. No.: 29,866

[22] Filed: Apr. 13, 1979

[51] Int. Cl.² ............................................. B01D 13/02
[52] U.S. Cl. ................................. 204/180 P; 204/301
[58] Field of Search ..................... 204/180 P, 301, 151, 204/109, 104, 46 R, 94, 111, 112, 13, 48, 130; 96/50 A, 60 BF, 61 M, 61 R, 22, 55

[56] References Cited

U.S. PATENT DOCUMENTS

| | | | |
|---|---|---|---|
| 3,124,520 | 3/1964 | Juda | 204/104 X |
| 4,013,527 | 3/1977 | Idota et al. | 204/151 |
| 4,128,464 | 12/1978 | Idota | 204/180 P X |
| 4,145,271 | 3/1979 | Nosse et al. | 204/301 X |

FOREIGN PATENT DOCUMENTS

| | | | |
|---|---|---|---|
| 47-38772 | 4/1972 | Japan | 204/151 |
| 49-286 | 12/1973 | Japan | 204/151 |

*Primary Examiner*—Arthur C. Prescott
*Attorney, Agent, or Firm*—Wenderoth, Lind & Ponack

[57] ABSTRACT

A method for regenerating a spent bleach-fixer solution by electrodialysis using an electrodialysis cell comprising a cathode, an anode and alternating anion exchange membranes and cation exchange membranes arranged therebetween to define a cathode compartment, a plurality of intermediate enionation and deionation compartments with a set of the deionation compartments alternately disposed between a set of the enionation compartments, and an anode compartment; said method comprising filling an electrolyte solution in the cathode compartment, the enionation compartments and anode compartment, and the spent bleach-fixer solution in the deionation compartments, and passing a direct electric current across the cathode and the anode; and an apparatus for use in the aforesaid method.

6 Claims, 2 Drawing Figures

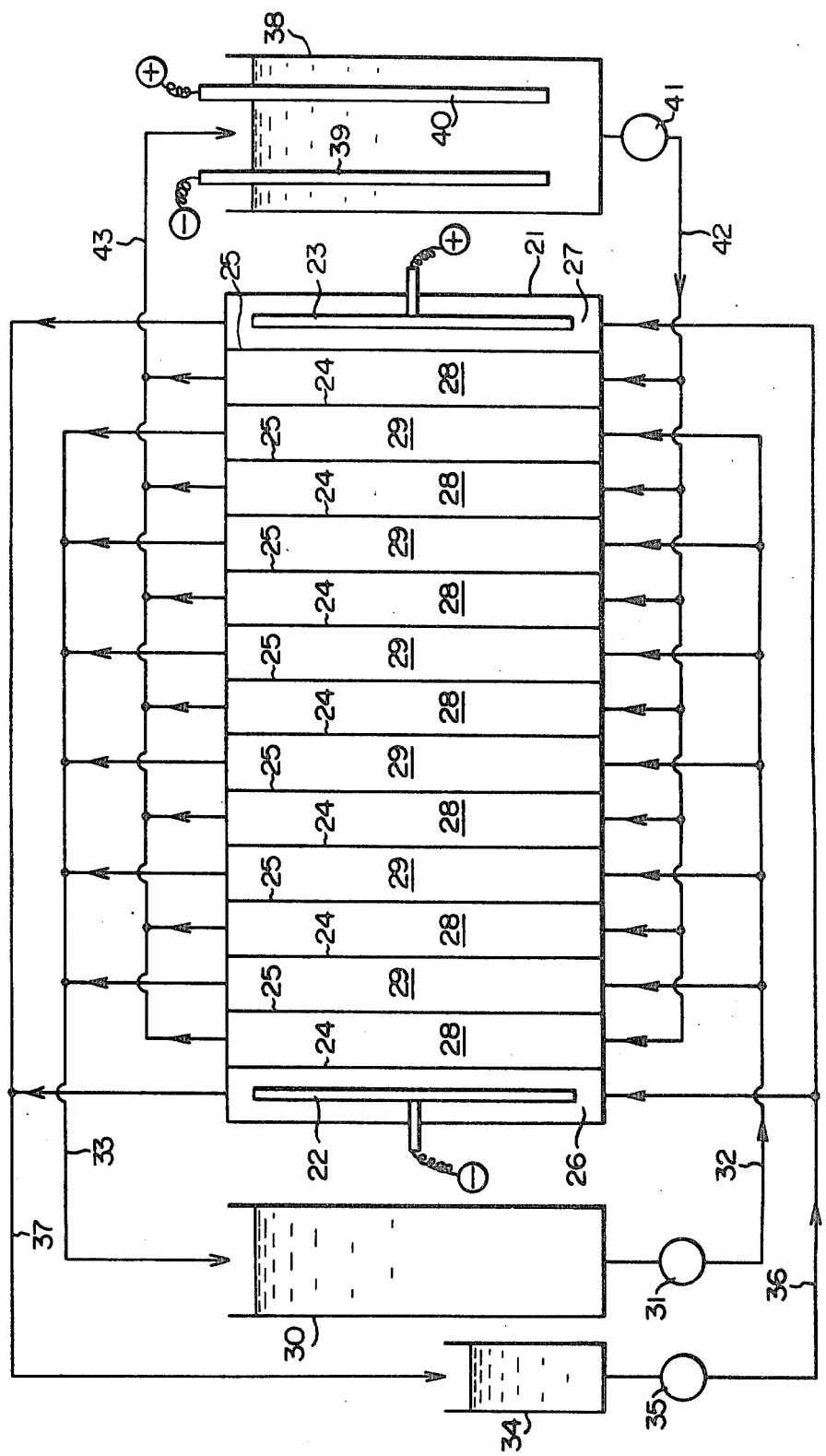

METHOD AND APPARATUS FOR REGENERATING SPENT PHOTOGRAPHIC BLEACH-FIXER SOLUTION

This invention relates to a method and an apparatus for regnerating a spent photographic bleach-fixer solution. More specifically, this invention relates to a method and an apparatus for regenerating a bleach-fixer solution spent in processing silver halide color photographic material, and also for recovering silver from the spent solution with good efficiency.

Silver halide color photographic material (color film or paper), after exposure, is processed by a series of steps including development, bleaching and fixing to form a color photographic image thereon. When the color photographic material is processed with a color developer solution, the exposed silver halide in the photographic emulsion is reduced to silver, and simultaneously the oxidized color developing agent (an oxidation product of an N,N-dialkyl p-phenylenediamine derivative) reacts with a coupler in the emulsion to form a color image. Silver deposited in the photographic emulsion as a result of the color development is oxidized by treatment with the bleaching solution to change to silver halide, which is then converted to a silver complex salt by treatment with the fixer solution and dissolved away. Hence, only the color image remains on the photographic material.

In this manner, the removal of silver from the photographic emulsion requires treatment with the bleaching solution and the fixer solution. To simplify the processing steps, a monobath called a "bleach-fixer solution" is also employed (see, for example, U.S. Pat. No. 3,582,322). The bleach-fixer solution contains a bleaching agent having weak oxidizability such as a ferric complex salt of an aminopolycarboxylic acid (e.g., a ferric complex salt of ethylenediaminetetraacetic acid) and an ordinary photographic fixer such as a compound capable of forming a silver complex salt (e.g., sodium thiosulfate or ammonium thiosulfate).

When a photographic material, after processing with a color developer solution, is treated with the bleach-fixer solution, the ferric complex salt of aminopolycarboxylic acid in the bleach-fixer solution oxidizes the developed silver in the photographic emulsion, and is itself reduced to the ferrous complex salt of aminopolycarboxylic acid. The silver ion resulting from the oxidation is converted to a silver complex salt by the action of the fixer, and is dissolved. The unexposed silver halide not reduced with the color developer solution reacts with the fixer in the bleach-fixer solution to be converted to a silver complex salt and a halogen ion (mainly a bromine ion), and is thus liberated from the photographic emulsion. Accordingly, the spent bleach-fixer contains the ferrous complex salt of aminopolycarboxylic acid, the silver complex salt and the halogen ion built up therein, and regeneration of the spent solution requires the following treatment procedures.

(a) To remove the silver complex salt from the spent solution, or to recover silver therefrom.

(b) To remove the halogen ion from the spent solution.

(c) To oxidize the ferrous complex salt of aminopolycarboxylic acid in the spent solution to a ferric complex salt of aminopolycarboxylic acid. (As is well known, the ferrous complex salt of aminopolycarboxylic acid readily changes to the corresponding ferric complex salt by air oxidization, electrolytic oxidation, etc.)

(d) To add lacking chemicals to adjust the composition of the regenerated bleach-fixer solution.

Techniques previously suggested for recovering silver from a spent bleach-fixer solution include, for example, a method of electrolyzing the spent bleach-fixer solution in an electrolytic cell including a cathode and an anode separated from each other by a diaphragm, while passing the spent solution from the cathode compartment to the anode compartment and excluding the air inside the electrolytic cell (Japanese Laid-Open Patent Publication No. 18191/73); and a method of electrolyzing a spent bleach-fixer solution while continuously passing the solution from the cathode section to the anode section is a diaphragm-free electrolytic cell (Japanese Laid-Open Patent Publication No. 98837/75).

According to these methods, the efficiency of recovery of silver is very low because the reduction of the ferric complex salt of aminopolycarboxylic acid occurs prior to the electrolytic deposition of silver at the cathode, and the silver is liable to re-dissolve in the bleach-fixer solution. In the above-cited Japanese Laid-Open Patent Publication, No. 18191/73, it is proposed to convert the ferric complex salt of aminopolycarboxylic acid to the corresponding ferrous complex salt in advance by adding a reducing agent such as sodium hydrosulfite to the spent bleach-fixer solution before the electrolysis, but the efficiency of silver recovery thus attained is still not enough.

It is an object of this invention to regenerate a spent photographic bleach-fixer solution for re-use in color photographic processing without inconveniences by removing a sliver complex salt and a halogen ion therefrom.

Another object of this invention is to recover the silver complex salt removed from the spent bleach-fixer solution, in the form of pure silver with good efficiency and without any of the inconveniences described hereinabove.

Other objects of the invention will become apparent from the following description.

To achieve the above objects, the present invention provides a method for regenerating a spent photographic bleach-fixer solution by electrodialysis using an electrodialysis cell comprising a cathode, an anode and alternating anion exchange membranes and cation exchange membranes arranged therebetween to define a cathode compartment, a plurality of intermediate enionation and deionation compartments with a set of the deionation compartments alternately disposed between a set of the enionation compartments, and an anode compartment; said method comprising filling an electrolyte solution in the cathode compartment, the enionation compartments and the anode compartment, and the spent bleach-fixer solution in the deionation compartments, and passing a direct electric current across the cathode and the anode.

In another aspect, the present invention also provides a method for recovering silver from a spent bleach-fixer solution while regenerating it, which comprises using an apparatus consisting of (a) an electrodialysis cell comprising a cathode, an anode and alternating anion exchange membranes and cation exchange membranes arranged therebetween to define a cathode compartment a plurality of intermediate enionation and deionation compartments with a set of the deionation compartments alternately disposed between a set of the enionation compartments, and an anode compartment, (b) an electrolysis cell connected to the enionation compartments of said electrodialysis cell for the circulation of an electrolyte solution between the electrolysis cell and said enionation compartments, (c) a spent bleach-fixer solution circulating tank connected to the deionation compartments of said electrodialysis cell for the circulation of the spent bleach-fixer solution between said circulating tank and said deionation compartments, and (d) an electrolyte solution circulating tank connected to the cathode compartment and anode compartment of said electrodialysis cell for the circulation of an electrolyte solution between said cirfulating tank and said cathode compartment and anode compartment; circulating the electrolyte solution between said enionation compartments and said electrolysis cell; circulating the spent bleach-fixer solution between said deionation compartments and said tank for circulating the spent bleach-fixer solution; passing a direct electric current across the anode and the cathode of said electrodialysis cell to perform electrodialysis continuously; and in the meanwhile, passing a direct electric current across the cathode and the anode of said electrolysis cell at the desired times to perform electrolysis.

The method and apparatus of this invention are described below more specifically with reference to the accompanying drawings in which:

FIG. 1 is a diagram of an electrodialysis cell for use in regenerating a spent bleach-fixer solution in this invention; and FIG. 2 is a diagram of an apparatus used in this invention to recover silver from a spent bleach-fixer solution while regenerating it.

Referring to FIG. 1, a cathode 22 and an anode 23 are provided at the terminals of an electrodialysis cell 21. Between these electrodes are alternately arranged a plurality of anion exchange embranes 24 and a plurality of cation exchange membranes 25 to define, from left to right in FIG. 1, a cathode compartment 26, an enionation compartment 28 (defined by an anion exchange membrane on the cathode side and a cation exchange membrane on the anode side), a deionation compartment 29 (defined by a cation exchange membrane on the cathode side and an anion exchange membrane on the anode side), an enionation compartment 28, a deionation compartment 29, . . . a deionation compartment 29, an enionation compartment 28, and an anode compartment 27. The material for the cathode 22 is, for example, iron, nickel, stainless steel, or the like. The anode 23 is made of, for example, graphite, platinum, or platinum-plated titanium. The anion exchange membrane 24 is desirably a strong base-type anion exchange membrane, and the cation exchange membrane 25 is desirably a strong acid-type cation exchange membrane. The shell of the electrodialysis cell 21 is made of an insulating material such as polyvinyl chloride, rubber, or rubber-lined iron.

An electrolyte solution is filled in the cathode compartment 26 and the anode compartment 27 through a pipe line 36. An electrolyte solution is also filled in the enionation compartments 28 through a pipe line 42. On the other hand, a spent bleach-fixer solution is filled in the deionation compartments 29 through pipe line 32.

The electrolyte solution is desireably an aqueous solution capable of dissolving silver salts, such as an aqueous solution of sodium thiosulfate or ammonium thiosulfate in a concentration of about 30 g/l. Hence, an ordinary photographic fixer solution containing such a thiosulfate can be directly used as the electrolyte solution in this process. In electrodialysis, a thiosulfate ion contained in the spent bleach-fixer solution in the deionation compartments moves by the enionation compartments together with a silver complex ion or a silver ion. Thus, the electrolyte solution filled in the enionation compartments gradually changes to an aqueous solution capable of dissolving a silver salt even when it originally has no ability to dissolve silver salts.

A decomposition inhibitor such as sodium sulfite may be added to the electrolyte solution to be filled in the enionation compartments. Or a reducing agent such as sodium hydrosulfite may also be added to reduce a ferric complex salt of aminopolycarboxylic acid which although in a very small amount, may move to the electrolyte solution in the enionation compartments from the spent bleach-fixer solution in the deionation compartments.

When a direct current is passed across the cathode 22 and the anode 23 after filling the cathode compartment 26, the enionation compartments 28, the deionation compartments 29 and the anode compartment 27 with the required solutions, a silver complex ion and a halogen ion (mainly a bromine ion) contained in the spent bleach-fixer solution in the deionation compartments 29 migrate to the enionation compartments 28 through the anion exchange membranes 24, and a silver ion dissociated from the silver complex ion migrates to the enionation compartments 28 through the cation exchange membranes 25. In the meanwhile, the ferric complex ion of aminopolycarboxylic acid and the ferous complex ion of aminopolycarboxylic acid contained in the spent breach-fixer solution scarcely move to the enionation compartments through the ion exchange membranes, and remain in the spent bleach-fixer solution. The silver complex ion, silver ion or halogen ion which has migrated to the electrolyte solution in the enionation compartments 28 builds up in the solution without forming a precipitate.

The silver complex ion, silver ion and halogen ion contained in the spent bleach-fixer solution can thus be removed by electrodialysis using ion exchange membranes, but the ferric complex ion of aminopolycarboxylic acid and the ferrous complex ion of aminopolycarboxylic acid cannot be removed by the same procedure. No clear reason has yet been assigned to this fact.

The electrodialysis treatment is continued, preferably at a current density of 0.01 to 2.0 A/dm$^2$ of ion exchange membrane, until the concentration of silver in the spent bleach-fixer solution in the deionation compartments is reduced to the desired level, preferably nearly to zero.

When the electrodialysis treatment is over, the bleach-fixer solution in the deionation compartments 29 is discharged out of the electrodialysis cell 21 through a pipe line 33. The ferrous complex salt of aminopolycarboxylic acid contained in the discharged solution is converted to the corresponding ferric complex salt by a known oxidation method such as air oxidation, and then lacking chemicals are added to regain the original composition before processing the photographic material. The revived bleach-fixer solution is again used for the processing of the photographic material. In the meanwhile, the electrolyte solution in the enionation compartments in which the silver complex ion, silver ion and halogen ion build up as a result of the electrodialytic treatment is discharged out of the electrodialysis cell 21 through a pipe line 43. It is then either discarded, or as required, subjected to a known method for recovering silver, for example an electrolytic treatment. The electrolyte solution in the cathode compartment 26 and the anode compartment 27 need not to be exchanged after the end of every cycle of electrodialysis, but as required, it is discharged out of the electrodialysis cell 21 through a pipe line 37 for replacement by a fresh electrolyte solution.

The method of this invention is not limited to the batchwise electrodialysis treatment described hereinabove, and can also be performed by a continuous procedure or a circulating procedure.

The continuous electrodialysis treatment can be performed, for example, in the following manner. Referring to FIG. 1, an electrolyte solution is filled in the cathode compartment 26 and the anode compartment 27. An electrolyte solution is supplied at a slow speed to enionation compartments 28 through the pipe line 42, and is simultaneously discharged at the same slow speed from the enionation compartments 28 into a receiver tank (not shown) provided outside the electrodialysis cell 21 through the pipe line 43. Furthermore, a spent bleach-fixer solution is fed into the deionation compartments through pipe line 32 and is simultaneously discharged at the same slow speed from the deionation compartments 29 into a receiver tank (not shown) disposed outside the electrodialysis cell 21 through the pipe line 33. The solution which is stored in the receiver tank for the electrolyte solution is discharged or subjected to a step of a recovering silver at suitable times. The solution which is stored in the receiver tank for the spent bleach-fixer solution is subjected to the same step as described above to revive its original composition feasible as a bleach-fixer solution.

The circulating procedure is performed, for example, by using the apparatus shown in FIG. 2.

The apparatus shown in FIG. 2 consists of the same electrodialysis cell 21 as shown in FIG. 1, a tank 30 for circulating the spent bleach-fixer solution, a tank 34 for circulating the electrolyte solution and an electrolysis cell 38. The electrolysis cell 38 has a cathode 39 and an anode 40, and is connected to enionation compartments 28 by means of pipe lines 42 and 43 through a pump 41 so as to circulate the electrolyte solution between the electrolysis cell 38 and the enionation compartments 28 of the electrodialysis cell 21. The tank 34 for circulating the electrolyte solution is connected to the cathode compartment 26 and anode compartment 27 by means of pipe lines 36 and 37 through a pump 35 so as to circulate the electrolyte solution between the tank 34 and the cathode compartment 26 and the anode compartment 27. The tank 30 for circulating the spent bleach-fixer solution is connected to the deionation compartments 29 by means of pipe lines 32 and 33 through a pump 31 so as to circulate the spent bleach-fixer solution between the tank 30 and the deionation compartments 29 of the electrodialysis cell 21.

The material for the cathode 39 and the anode 40 in the electrolysis cell 38 can be the same as those described hereinabove with regard to the cathode 22 and the anode 23 of the electrodialysis cell 21. The electrolysis cell 38, the tank 34, the tank 30 and the pipe lines 32, 33, 36, 37, 42 and 43 are made of the same insulating material as the electrodialysis cell 21.

When a direct current is passed across the cathode 39 and the anode 40 of the electrolysis cell 38 in the apparatus shown in FIG. 2 while circulating the solutions as described above, a silver complex ion, a silver ion and a halogen ion contained in the spent bleach-fixer solution in the deionation compartments 29 migrate to the electrolyte solution in the enionation compartments 28 thereby to regenerate the spent bleach-fixer solution. In the meantime, the electrolyte solution in the enionation compartments 28 in which the silver complex ion, silver ion and halogen ion build up is electrolyzed in the electrolysis cell, and metallic silver is electrodeposited at the cathode 39.

The electrodialytic treatment, i.e. the passing of a current across the cathode 22 and the anode 23, is continued until the silver concentration of the spent bleach-fixer solution in the deionation compartments 29 is reduced to the desired level, preferably at a current density of 0.01 to 2.0 $A/dm^2$ of ion exchange membrane.

The electrolytic treatment, i.e. the passing of a current across the cathode 39 and the anode 40, needs not always to be performed simultaneously with the electrodialytic treatment, or to be performed continuously. For example, the electrolysis treatment may be performed after the completion of the electrodialysis treatment. Or the electrolysis treatment may be performed intermittently so that the current is passed only when the electrolyte solution in the enionation compartments 28 contains a silver complex ion and a silver ion in a certain predetermined concentration, e.g., in a concentration, as silver, of at least 2 g/l. It is generally preferred that the electrolysis should be performed at a current density of 0.05 to 1.0 $A/dm^2$ of cathode while stirring the electrolyte solution as required. It is generally undesirable from the viewpoint of efficiency to continue to electrolysis until the amounts of the silver complex ion and silver ion in the electrolyte solution are reduced to below 0.1 g/l as silver.

When the electrodialytic treatment is over, the bleach-fixer solution in the deionation compartments 29 is subjected to the same oxidation treatment as described hereinabove with regard to FIG. 1 to oxidize the ferrous complex salt of aminopolycarboxylic acid contained therein, and replenished with lacking chemicals for reuse in processing photographic material.

In the electrolytic treatment in the electrolysis cell 38, the electrolyte solution scarcely contains the ferric and ferrous complex salts of aminopolycarboxylic acid. Accordingly, the electrodeposited silver does not dissolve in the solution, and can be recovered with a very good efficiency.

The following non-limitative Examples further illustrate the present invention.

EXAMPLE 1

A print-exposed color paper was treated with a color developer solution to form a color image, and then processed with a bleach-fixer solution having the composition shown in column (A) in Table 1 to dissolve and remove silver and silver bromide remaining on the color paper. The spent bleach-fixer solution had the composition shown in column (B) of Table 1.

An electrodialysis cell of the type shown in FIG. 1 was provided which included a stainless steel cathode and a platinum-plated titanium anode and seven anion exchange membranes and seven cation exchange membranes alternately arranged between the cathode and the anode to define a cathode compartment, enionation compartments, deionation compartments, and an anode compartment in the manner shown in FIG. 1. Ten liters of the spent bleach-fixer solution was filled in the deionation compartments, and an aqueous solution of sodium sulfate having a concentration of 30 g/l was filled in the cathode compartment and the anode compartment. Further, 10 liters of an aqueous solution containing 150 g/l of sodium thiosulfate and 25 g/l of sodium sulfite was filled in the enionation compartments. A direct electric current was passed across the cathode and the anode so as to adjust the current density of the ion exchange membranes to 0.2 A/dm$^2$.

As a result of the aforesaid electrodialysis treatment, the composition of the electrolyte solution in the enionation compartments changed to

| | |
|---|---|
| Sodium thiosulfate | 148 g/l |
| Sodium sulfite | 24 g/l |
| Silver complex salt of silver ion | 2.4 g/l (as silver) |

The composition of the spent bleach-fixer solution in the deionation compartments changed to that shown in column (C) in Table 1.

The bleach-fixer solution was taken out of the deionation compartments, and air was blown into it to oxidize the ferrous complex salt of ethylene diamine tetraacetic acid to the corresponding ferric complex salt. Lacking chemicals were supplied to prepare a revived bleach-fixer solution having the composition shown in column (D) in Table 1. When this revived bleach-fixer solution was again used to bleach and fix a color paper, the photographic characteristics of the processed color paper were quite the same as those of the color paper processed with a fresh bleach-fixer solution having the composition shown in column (A) of Table 1.

Table 1

| | Bleach-fixer solution | | | |
|---|---|---|---|---|
| Components | (A) Fresh Solution | (B) Spent solution (before electro-dialysis) | (C) After electro-dialysis | (D) Revived solution |
| Ethylenediamine-tetraacetic acid (g/l) | 10 | 9 | 9 | 10 |
| Ferric complex salt of ethylenediaminetetraacetic acid (g/l) | 40 | 35 | 35 | 40 |
| Ferrous complex salt of ethylenediaminetetraacetic acid (g/l) | 0 | 5 | 5 | 0 |
| Sodium sulfite (g/l) | 5 | 5 | 4 | 5 |
| Trisodium phosphate (g/l) | 12 | 12 | 11 | 12 |
| Ammonium thiosulfate (g/l) | 70 | 66 | 63 | 70 |
| Silver complex ion (as silver) (g/l) | 0 | 2.5 | 0.3 | 0.3 |
| Bromine ion (g/l) | 0 | 1.8 | 0.2 | 0.2 |
| pH (at 25° C.) | 7.0 | 7.0 | 6.9 | 7.0 |

EXAMPLE 2

A print-exposed color paper was processed with a color developer solution, and then with a bleach-fixer solution having the composition shown in column (A) of Table 2 to dissolve and remove silver and silver bromide remaining on the color paper. The composition of the spent bleach-fixer solution was as shown in column (B) of Table 2.

An electrodialysis cell of the type shown in FIG. 2 was provided which included a stainless steel cathode 22, a platinum-plated titanium anode 23, and 14 anion exchange membranes 24 and 14 cation exchange membranes 25 arranged alternately to define a cathode compartment, enionation compartments, deionation compartments and an anode compartment in the manner shown in FIG. 2. Twenty liters of the spent bleach-fixer colution was circulated between the deionation compartments 29 and the circulating tank 30. In the meanwhile, an aqueous solution of sodium sulfate having a concentration of 30 g/l was circulated between the cathode compartment 26 and anode compartment 27 and the circulating tank 34. Furthermore, 20 liters of an electrolyte solution having the composition shown in column (A) of Table 3 was circulated between the enionation compartments 28 and the electrolysis cell 38 including cathode 39 and anode 40. A direct electric current was passed across the cathode 22 and the anode 23 of the electrodialysis cell.

After the electrodialysis for 10 hours, the composition of the spent bleach-fixer solution [column (B) in Table 2] changed to that shown in column (C) of Table 2. Air was blown into this solution to oxidize the ferrous complex salt of ethylene diamine tetraacetic acid, and lacking chemicals were added to prepare a revived bleach-fixer solution having the composition shown in column (D) of Table 2. When the revived bleach-fixer was used again for the bleach-fixing treatment of a color paper, the photographic characteristics of the processed color paper were quite the same as those of a color paper processed with a fresh bleach-fixer solution having the composition shown in column (A) of Table 2.

After the electrodialysis, the composition of the electrolyte solution in the electrolysis cell 38 changed to that shown in column (B) of Table 3. A direct electric current was passed across the cathode 39 and the anode 40 of the electrolysis cell 38 so that the current density of the cathode became 0.2 A/dm$^2$. After the electrolysis for 10 hours, the composition of the aqueous solution of electrolyte changed to that shown in column (C) of Table 3. At the stainless steel cathode, about 40 g of pure silver was electrodeposited. The current efficiency of electrodeposition of silver at the cathode was 95%.

Table 2

| | Bleach fixer solution | | | |
|---|---|---|---|---|
| Components | (A) Fresh Solution | (B) Spent solution (before electro-dialysis) | (C) After electro-dialysis | (D) Revived solution |
| Ferric complex salt of ethylenediaminetetraacetic acid (g/l) | 40 | 35 | 35 | 40 |
| Ferrous complex salt of ethylenediaminetetraacetic acid (g/l) | 0 | 5 | 5 | 0 |
| Sodium sulfite (g/l) | 10 | 8 | 6 | 10 |
| Ammonium thiosulfate (g/l) | 70 | 60 | 50 | 70 |
| Silver complex ion (as silver) (g/l) | 0 | 2.5 | 0.3 | 0.3 |
| Bromine ion (g/l) | 0 | 1.8 | 0.1 | 0.1 |
| pH (at 25° C.) | 7.0 | 7.0 | 6.8 | 7.0 |

Table 3

| Components | Electrolyte solution | | |
|---|---|---|---|
| | (A) Before electro-dialysis | (B) After electro-dialysis (before electro-lysis | (C) After electro-lysis |
| Sodium sulfite (g/l) | 5 | 7 | 5 |
| Ammonium thiosulfate (g/l) | 10 | 18 | 16 |
| Silver complex ion (calculated as silver) (g/l) | 0 | 2.2 | 0.2 |

What we claim is:

1. A method for regenerating a spent bleach-fixer solution by electrodialysis using an electrodialysis cell comprising a cathode, an anode and alternating anion exchange membranes and cation exchange membranes arranged therebetween to define a cathode compartment, a plurality of intermediate enionation and deionation compartments with a set of the deionation compartments alternately disposed between a set of the enionation compartments, and an anode compartment; said method comprising filling an electrolyte solution in the cathode compartment, the enionation compartments and anode compartment, and the spent bleach-fixer solution in the deionation compartments, and passing a direct electric current across the cathode and the anode.

2. The method of claim 1 wherein an aqueous solution capable of dissolving silver salts is filled in the enionation compartments as the electrolyte solution.

3. The method of claim 2 wherein the aqueous solution capable of dissolving silver salts is an aqueous solution of sodium thiosulfate or ammonium thiosulfate.

4. A method for regenerating a spent photographic bleach-fixer solution using the apparatus of claim 4, which comprises circulating an electrolyte solution between the enionation compartments and the electrolysis cell, circulating the spent bleach-fixer solution between the deionation compartments and the circulating tank for the spent bleach-fixer solution, circulating the electrolyte solution between the cathode compartment and the electrolyte solution circulating tank, passing a direct electric current across the cathode and the anode of the electrodialysis cell to perform electrodialysis continuously, and in the meantime, passing a direct electric current across the cathode and the anode of the electrolysis cell at the desired time to perform electrolysis.

5. The method of claim 4 wherein an aqueous solution capable of dissolving silver salts is circulated as the electrolyte solution between the enionation compartments and the electrolysis cell.

6. The method of claim 5 wherein the aqueous solution capable of dissolving silver salts is an aqueous solution of sodium thiosulfate or ammonium thiosulfate.

* * * * *